(12) United States Patent
Ghazaryan (10) Patent No.: US 10,702,360 B2
(45) Date of Patent: Jul. 7, 2020

(54) FILTER UNIT FOR SUCTION SYSTEMS OF DENTAL EQUIPMENT

(71) Applicant: Artyom Ghazaryan, Gyumri (AM)

(72) Inventor: Artyom Ghazaryan, Gyumri (AM)

( * ) Notice: Subject to any disclaimer, the term of this patent is extended or adjusted under 35 U.S.C. 154(b) by 0 days.

(21) Appl. No.: 16/310,961

(22) PCT Filed: May 29, 2017

(86) PCT No.: PCT/AM2017/000003
§ 371 (c)(1),
(2) Date: Dec. 18, 2018

(87) PCT Pub. No.: WO2018/006106
PCT Pub. Date: Jan. 11, 2018

(65) Prior Publication Data
US 2020/0093581 A1    Mar. 26, 2020

(51) Int. Cl.
*A61C 17/06* (2006.01)
*A61C 17/14* (2006.01)

(52) U.S. Cl.
CPC ............ *A61C 17/065* (2019.05); *A61C 17/14* (2013.01)

(58) Field of Classification Search
CPC ............................... A61C 17/065; A61C 17/14
USPC ....................................................... 210/440
See application file for complete search history.

(56) References Cited

U.S. PATENT DOCUMENTS

| 3,756,275 | A | * | 9/1973 | Barrera | F16K 11/0743 |
| | | | | | 137/590 |
| 3,777,403 | A | | 12/1973 | Ritchie | |
| 4,700,412 | A | * | 10/1987 | Manuel | B01D 36/04 |
| | | | | | 137/247.51 |
| 4,915,831 | A | * | 4/1990 | Taylor | B01D 35/30 |
| | | | | | 206/1.5 |
| 5,039,304 | A | * | 8/1991 | Heil | A61C 1/18 |
| | | | | | 433/126 |
| 5,154,823 | A | * | 10/1992 | Ma | B01D 35/30 |
| | | | | | 210/232 |
| 5,336,406 | A | | 8/1994 | Stanford | |

(Continued)

FOREIGN PATENT DOCUMENTS

| KR | 101300050 | | 8/2013 | | |
| KR | 101300050 | B1 * | 8/2013 | ............ | A61C 17/06 |
| WO | WO8302720 | | 8/1983 | | |

*Primary Examiner* — Claire A Norris
*Assistant Examiner* — Ekandra S. Miller-Cruz
(74) *Attorney, Agent, or Firm* — Aleksandr Smushkovich (57) ABSTRACT

A filter unit for a conventional suction system of dental equipment is proposed. It consists of a disposable filter and a connecting module fixed to the suction system. The connecting module removably connects the disposable filter to the system, and includes—an inlet pipe passing a water flow and solid contents from the system, —an outlet pipe returning the water flow into the system, —a hole communicating with the inlet pipe, —a pipe projection communicating with the outlet pipe, and—fixing slots. The filter includes—a container collecting the solid contents, —a cover including inlet and outlet holes and provided with fixing projections removably engaged with the fixing slots, and—a lock-fixer rotatably mounted within the cover. It allows for removable connecting the filter to the system, which significantly improves convenience of servicing the system, safety and sanitary protection of dental personnel.

2 Claims, 6 Drawing Sheets

(56) References Cited

U.S. PATENT DOCUMENTS

| | | | | |
|---|---|---|---|---|
| 5,716,210 A | * | 2/1998 | Novak | A61C 1/0007 433/80 |
| 5,826,854 A | * | 10/1998 | Janvrin | B01D 27/08 251/149.9 |
| 8,506,293 B2 | * | 8/2013 | Pond | A61C 1/0084 433/119 |
| 8,709,246 B2 | * | 4/2014 | Branscomb | B01D 35/153 210/232 |

* cited by examiner

FILTER UNIT FOR SUCTION SYSTEMS OF DENTAL EQUIPMENT

CROSS-REFERENCE TO RELATED APPLICATIONS

This application is a U.S. national stage application of an international application PCT/AM2017/000003 filed on 29 May 2017, published as WO/2018/06106, which international application claims priority of a patent application AM20160061 filed on 7 Jul. 2016.

FIELD OF THE INVENTION

The invention relates to the field of medical devices, in particular to dental units and can be used in their suction systems.

BACKGROUND OF THE INVENTION

There are known various filters (see Sources of Information below: 1-4) which are located in hydro blocks of dental devices or are built in separate suction systems. Those filters have inlet and outlet hoses, a covering to which a mesh filter is attached. On that mesh, with the help of the inlet hose, contents of solid substances (pieces of tooth, filling, amalgam, blood clot and etc.) arising during dental treatment and moved from the suction system, are collected.

The main deficiency of those filters is that, at the end of each work day, it is necessary to open the covering, remove the mesh filter, empty it, then wash, disinfect and place back. It's an unpleasant, dirty, dangerous and time-consuming procedure.

By technicity the filter of those dental device suction systems is much closer to the invention. It has a connecting module to which a receiving container is attached, which container receives the contents from the suction system. A filter which has a preventing mesh is placed in the receiving container. The outlet hose is attached to the connecting module, the inlet hose is attached at the bottom of the container.

During dental treatment the contents of the suction system are moved to the receiving container. The solid substance with the help of the mesh filter remains in the container.

The deficiency of this filter is also that, at the end of each work day, it is necessary to disconnect the receiving container with the filter from the connecting module, empty it, then wash, disinfect it, and again bring it to the working state.

OBJECT AND BRIEF DESCRIPTION OF THE INVENTION

The object of the invention is to ensure the safety of service of a filter of the suction system of a dental device and shorten the time necessary for such service.

According to preferred embodiments of the present invention, there is proposed a filter unit for a conventional suction system of dental equipment; wherein the filter unit consists of a disposable filter and a connecting module that connects the disposable filter to the suction system.

The disposable filter comprises: a container receiving and collecting solid contents from the suction system, a cover, and a lock-fixer mounted within the cover with a possibility of rotation. The cover includes a cover disc-like part and a cover ring-like part (located around an inner side of the cover disc-like part), while the cover disc-like part and the cover ring-like part are coupled to each other. The cover disc-like part includes an inlet hole and an outlet hole. There is a preventing mesh mounted inside the outlet hole. The cover ring-like part is provided with a number of diametrically opposite fixing projections. The lock-fixer includes an outlet pipe projection and an inlet pipe projection.

The connecting module is coupled with the suction system, and includes a housing consisting of a module disc-like part and a module ring-like part (located around an inner side of the module disc-like part), while the module disc-like part and the module ring-like part are coupled to each other. The connecting module further includes an inlet branch pipe and an outlet branch pipe, coupled with the housing, and serving for input and output of a water flow bearing the solid contents coming from the suction system. The module disc-like part is provided with a hole communicating with the inlet branch pipe and a pipe projection communicating with the outlet branch pipe. The module ring-like part is provided with a number of diametrically opposite slots. Engagement and disengagement of the fixing projections with the slots provides for attachment and detachment of the disposable filter with and from the connecting module.

The removable attachment of the disposable filter provides for improved sanitary conditions and safety of dental personal, convenience, and fast servicing of the suction system.

BRIEF DESCRIPTION OF DRAWINGS OF THE INVENTION

The essence of the proposed invention is illustrated in the attached drawings, wherein.

DESCRIPTION OF PREFERRED EMBODIMENTS OF THE INVENTION

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Figure 1:
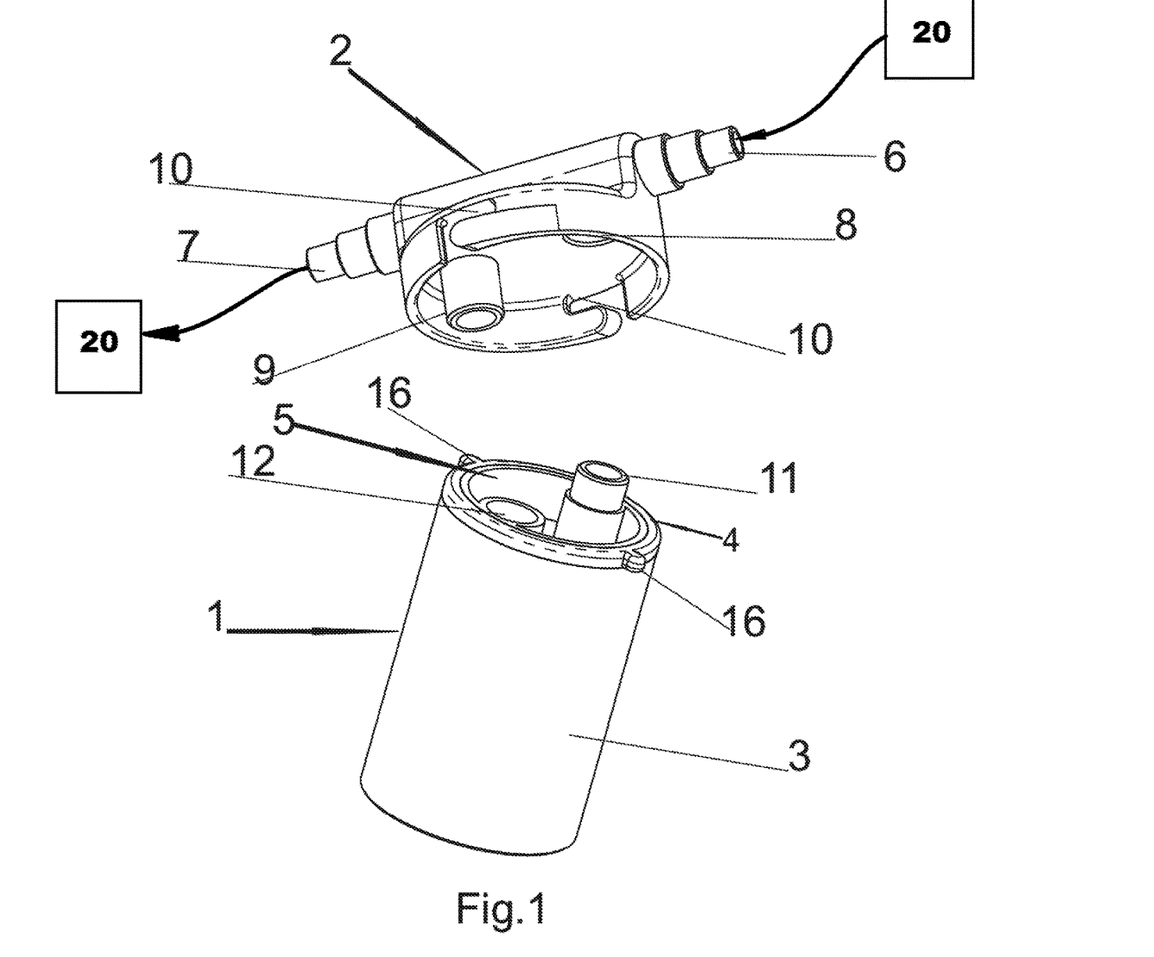
FIG. 1 depicts an exploded view of a proposed disposable filter and a connecting module capable of being assembled with the disposable filter in one filter unit; which filter unit is usable for operation of a conventional dental device hydro block suction system (herein also called 'suction system'—not shown) of a dental device, according to a preferred embodiment of the invention.

As mentioned above and shown in FIGS. 1 and 2, the inventive filter unit for a dental device's suction system consists of a disposable filter (1) and a connecting module (2), which connects the filter (1) to the suction system.

Figure 2:
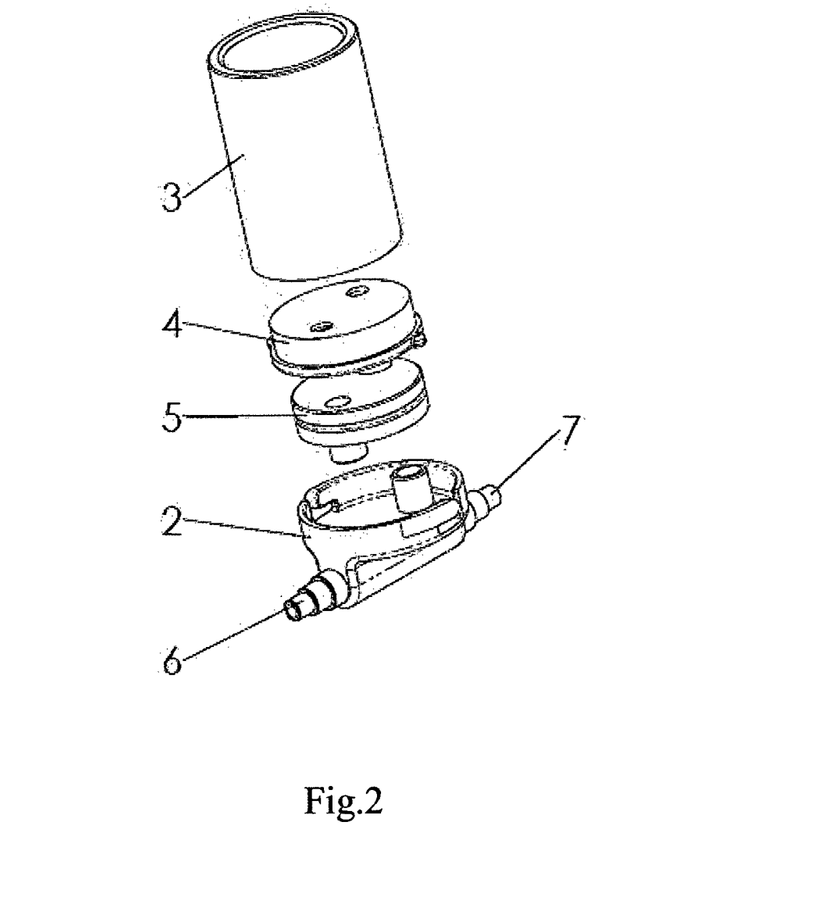
FIG. 2 depicts a detail exploded view of the proposed disposable filter and the connecting module, according to a preferred embodiment of the invention.

As shown in FIG. 2, the disposable filter (1) comprises: a container (3) receiving the contents from the suction system borne by a water flow created by the suction system, and collecting the contents, while passing the water flow therethrough; a cover (4) fixed to and covering the container (3); and a lock-fixer (5), rotatably mounted in the cover (4).

The connecting module (2) is fixed to a respective hose of the suction system. The connecting module (2) has an inlet branch pipe (6) and an outlet branch pipe (7) for moving the contents from the suction system.

The inlet branch pipe (6) and the outlet branch pipe (7) may preferably have a variable outer diameter of 6 mm, 8 mm, 10 mm that allows connecting both to large and small hoses of the suction systems.

The inlet branch pipe (6) is attached to the input of the contents into the connecting module (2), while the outlet branch pipe (7) is attached to the output of the contents from the connecting module (2).

The connecting module (2) includes a module disc-like part and a module ring-like part coupled to each other. The module ring-like part creates a circular border around the inner side of the module disc-like part (see FIGS. 1 and 3).

Figure 3:
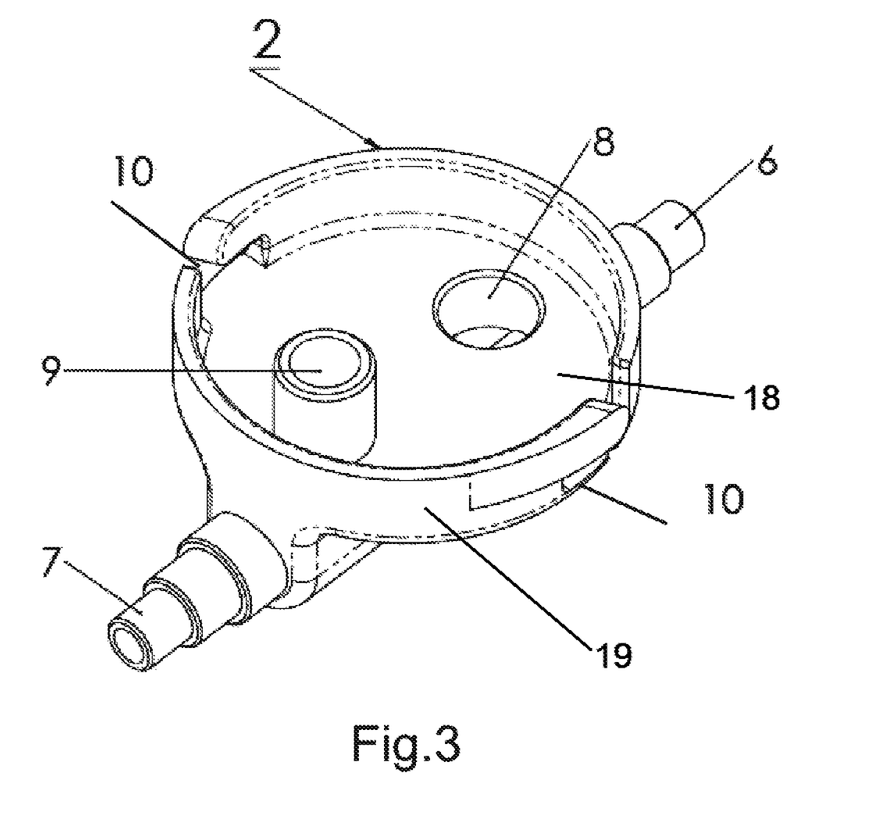
FIG. 3 depicts an isometric view of the connecting module showing its components in detail, according to a preferred embodiment of the invention.

A hole (8) is provided in the module disc-like part, as shown in FIG. 3. The hole (8) is operatively connected to the inlet pipe projection (11) of the lock fixer (5), as can it be understood from FIG. 1. The hole (8) communicates with the inlet branch pipe (6) of the connecting module (2). Also, a pipe projection (9) is provided coupled to the module disc-like part, as shown in FIG. 3. The pipe projection (9) is operatively connected to the outlet pipe projection (12) of the lock fixer (5), as can it be understood from FIG. 1. The pipe projection (9) communicates with the outlet branch pipe (7) of the connecting module (2). The hole (8) and the pipe projection (9) are provided for attaching the filter (1) to the connecting module (2).

On the module ring-like part, of a number of fixing slots (10) (preferably two diametrically opposite slots, as shown in FIG. 3) are provided, through which the filter (1) is removably attached to the connecting module (2).

Figure 5:
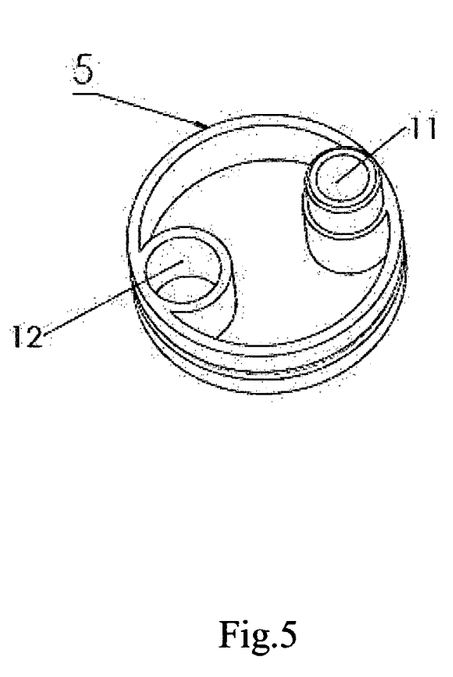
FIG. 5 depicts an isometric view of a lock-fixer being part of the proposed filter installed in the cover with a possibility of rotation, according to a preferred embodiment of the invention.
Figure 6:
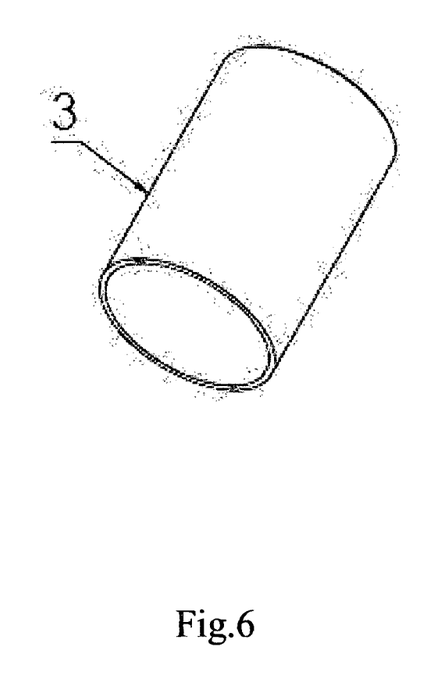
FIG. 6 depicts an isometric view of a container, being part of the proposed filter, which container receives and collects the contents moved from the suction system, according to a preferred embodiment of the invention.

As shown in FIG. 5, the lock-fixer (5) with a possibility of rotation is installed in the cover (4); the lock-fixer (5) has an inlet pipe projection (11) and an outlet pipe projection (12).

Figure 4:
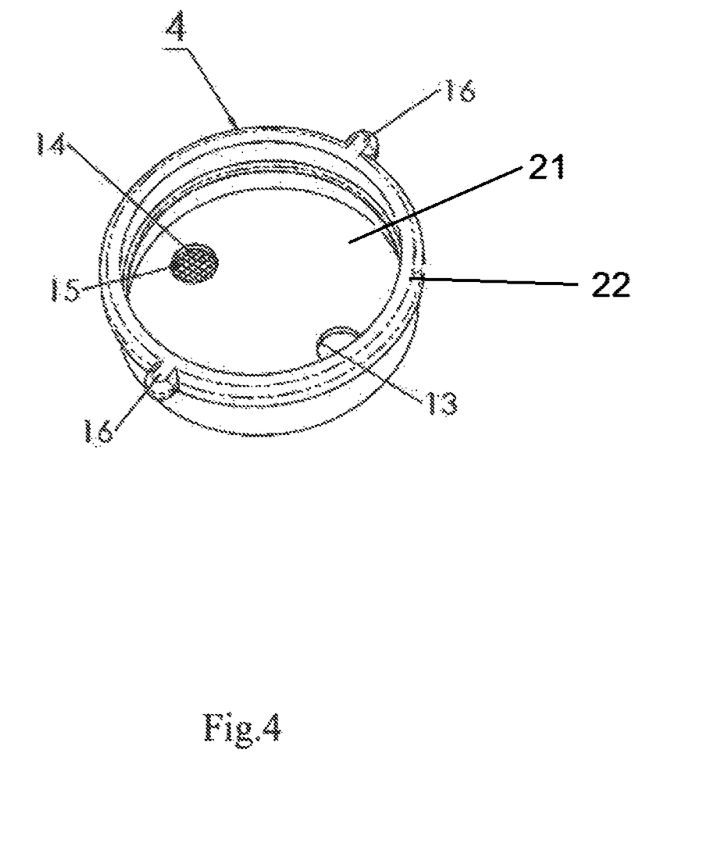
FIG. 4 depicts an isometric view of a cover being part of the proposed filter, according to a preferred embodiment of the invention.

As shown in FIG. 4, the cover (4) is composed of a cover disc-like part and a cover ring-like part coupled to each other, while the cover ring-like part creates a circular border around the cover inner side of the disc-like part. The cover disc-like part includes an inlet hole (13), an outlet hole (14); and a preventing mesh (15) placed inside the outlet hole (14), with the help of which the contents remain in the container (3). However, the aforementioned water flow essentially freely passes through these holes during operation of the suction system.

As also shown in FIG. 4, on the outer surface of the cover (4), a number of fixing projections (16) (preferably two diametrically opposite fixing projections, as shown in FIG. 4) are provided with a possibility of fixation in the fixing slots (10) located in the ring-like part of the connecting module (2).

The cover (4) is rigidly attached with glue to the container (3) receiving content from the suction system.

The connecting module (2) is designed for multiple use. It is preferably made of polystyrene. In contrast, the filter (1) is designed for a single use, that is being disposable. All parts of the filter are preferably made of polypropylene.

The inventive filter operates as follows:

When the filter (1) is attached to the connecting module (2), the lock-fixer (5) rotates; the inlet hole (13) and the outlet hole (14) are opened (i.e. the inlet hole (13) coincides with the inlet pipe projection (11) of the lock-fixer (5), while the outlet hole (14) coincides with the outlet pipe projection (12) of the lock-fixer (5)), and the filter (1) is brought to the operating position.

At the end of work day, it is necessary to disconnect the filter (1) from the connecting module (2). During removal of the filter (1), the lock-fixer (5) rotates thereby closing the inlet hole (13) (the inlet hole (13) doesn't coincide with the inlet pipe projection (11) anymore) and the outlet hole (14) (the outlet hole (14) doesn't coincide with the outlet pipe projection (12) anymore), whereby the filter (1) is brought to the non-operating state. In such a way, the hard substances, included in the contents coming from the suction system, are collected on the preventing mesh (15), and thus they are not removed from the filter (1) and disposed therewith.

It is necessary to dispose of the used filter, and a new filter is attached to the connecting module (2).

The replacement of the used filter with a new one takes from a few minutes; thus the servicing of the filter becomes faster, and, most importantly, safer, as the medical staff does not communicate with the content of the disposed filter.

SOURCES OF INFORMATION

1. Sirona. C8+Solo, C8+Solo Cart/Side delivery, C8+Cart Stand alone, C8+Side delivery Stand alone. Instruction manual, section10. Care and cleaning performed by the practicfe staff manuals.sirona.com/home.HomeDms-Document.download.html?id=147
2. Operation manual. Dental devices DIPLOMAT ADEPT DA 370 DIPLOMAT ADEPT DA 380. http://www.eur-med.sk/fileadmin/eurmed/produkty/Diplomat_dental/da370_da380/subory/RU_D A370-DA380_CART_2013_06.pdf.
3. Instruction on care. KaVo Primus® 1058 S/TM/C. Methods of preparation in accordance with the standard DIN EN ISO 17664.
2.6 Module processing of the patient.
2.5.4 The preparation of strainer insert of suction hoses file:///D:/Users/USER/Downloads/PA_1058_20131129_15_RU.PDF,
4. FONA-2000L Dental device. Instruction manual. 5. Care, cleaning and servicing www.dentex.ru/upload/iblock/67a/67a917fc2fbc571e021d1539d70d6388.pdf.
5. Usage guidelines. Instruction/Installation/Technical manual. Adaptable model ST-D520, ST-D530, ST-D307—the closest comparison www.medteh.info/_Id/18/1838_ST-D307-520.doc.

The invention claimed is:

1. A filter unit for a conventional suction system of dental equipment; said filter unit consists of a disposable filter and a connecting module fixed to the suction system; said connecting module removably connects said disposable filter to the suction system; wherein the disposable filter comprises:

a container receiving and collecting solid contents coming thereinto with a water flow from the suction system;

a cover rigidly attached to the container; said cover includes a cover disc-like part and a cover ring-like part located on an inner side of the cover disc-like part, the cover disc-like part and the cover ring-like part are coupled to each other while the cover ring-like part creates a circular border on the inner side of the cover disc-like part; the cover disc-like part includes an inlet hole and an outlet hole; the cover ring-like part is provided with a number of diametrically opposite fixing projections; said cover further includes a preventing mesh mounted inside the outlet hole preventing the solid contents from exiting said disposable filter; and a lock-fixer rotatably mounted within the cover; the lock-fixer includes an outlet pipe projection and an inlet pipe projection;

the connecting module comprises:

an inlet branch pipe passing the water flow and the solid contents from the suction system into said disposable filter;

an outlet branch pipe passing the water flow from said disposable filter back into the suction system; and a module disc-like part and a module ring-like part coupled to each other; the module ring-like part creates a circular border on an inner side of the module disc-like part; said module disc-like part is provided with a hole communicating with the inlet branch pipe, and removably connected to the inlet pipe projection of said lock-fixer, providing for removable attachment of the disposable filter to the connecting module; said module disc-like part is provided with a pipe projection coupled thereto, the pipe projection communicates with the outlet branch pipe, and is removably connected to the outlet pipe projection of said lock-fixer, providing for removable attachment of the disposable filter to the connecting module; the module ring-like part includes a number of diametrically opposite fixing slots operatively engaging with the fixing projections of said cover, thereby providing for removable attachment of the disposable filter to the connecting module.

2. The filter unit according to claim 1, wherein the connecting module is made of polystyrene, and the disposable filter is made of polypropylene.

\* \* \* \* \*